United States Patent
Cooprider et al.

(10) Patent No.: US 12,472,875 B2
(45) Date of Patent: Nov. 18, 2025

(54) METHOD AND APPARATUS FOR CMS HAVING TOUCHSCREEN-BASED ZOOM FEATURES

(71) Applicant: Stoneridge Electronics AB, Solna (SE)

(72) Inventors: Troy Otis Cooprider, White Lake, MI (US); Banuprakash Murthy, Novi, MI (US); Arunshankar Dhandayuthapany, Auburn Hills, MI (US)

(73) Assignee: Stoneridge Electronics AB, Solna (SE)

( * ) Notice: Subject to any disclaimer, the term of this patent is extended or adjusted under 35 U.S.C. 154(b) by 8 days.

(21) Appl. No.: 18/591,202

(22) Filed: Feb. 29, 2024

(65) Prior Publication Data
US 2025/0276644 A1    Sep. 4, 2025

(51) Int. Cl.
| | |
|---|---|
| *G06V 20/56* | (2022.01) |
| *B60R 1/25* | (2022.01) |
| *B60R 1/28* | (2022.01) |
| *G06F 3/04883* | (2022.01) |
| *G06T 7/70* | (2017.01) |
| *G06V 20/59* | (2022.01) |
| *G08G 1/04* | (2006.01) |

(52) U.S. Cl.
CPC ............ *B60R 1/28* (2022.01); *G06F 3/04883* (2013.01); *B60R 2300/105* (2013.01); *B60R 2300/802* (2013.01); *G06F 2203/04806* (2013.01); *G06F 2203/04808* (2013.01)

(58) Field of Classification Search
CPC . B60R 1/28; B60R 2300/10; B60R 2300/802; G06F 3/04883; G06F 2203/04806; G06F 2203/04808
See application file for complete search history.

(56) References Cited

U.S. PATENT DOCUMENTS

| | | | |
|---|---|---|---|
| 10,893,206 B1* | 1/2021 | Bart | H04N 5/265 |
| 11,890,990 B2 | 2/2024 | Huizen et al. | |
| 2007/0097089 A1* | 5/2007 | Battles | G06F 3/04847 345/173 |

(Continued)

FOREIGN PATENT DOCUMENTS

| | | | | |
|---|---|---|---|---|
| CN | 102187694 A | * | 9/2011 | H04L 67/52 |
| DE | 102009032637 | * | 7/2009 | |

(Continued)

OTHER PUBLICATIONS

Conway, David P translation of CN 102187694 A May 28, 2009 (Year: 2009).*

(Continued)

*Primary Examiner* — Zaihan Jiang
(74) *Attorney, Agent, or Firm* — Carlson, Gaskey & Olds, P.C.

(57) ABSTRACT

A method for a camera monitor system (CMS) includes displaying image feeds from a plurality of CMS cameras on a plurality of CMS displays. The image feeds depict an environment surrounding a commercial vehicle. The method also includes receiving a touchscreen command for a particular one of the CMS displays on a touchscreen interface and adjusting a zoom level of the image feed on the particular one of the CMS displays based on the touchscreen command. A camera monitor system (CMS) is also disclosed.

18 Claims, 8 Drawing Sheets

(56) References Cited

U.S. PATENT DOCUMENTS

| | | | |
|---|---|---|---|
| 2010/0299641 A1* | 11/2010 | Cundill | G06F 3/04883 715/863 |
| 2013/0167088 A1* | 6/2013 | Mangum | G06F 3/0486 715/835 |
| 2014/0002374 A1* | 1/2014 | Hunt | G06F 3/0488 345/173 |
| 2014/0111456 A1* | 4/2014 | Kashiwa | G06F 3/04883 345/173 |
| 2014/0136054 A1* | 5/2014 | Hsia | B60R 1/27 701/42 |
| 2014/0150026 A1* | 5/2014 | Mountain | H04N 21/42204 725/52 |
| 2015/0338982 A1* | 11/2015 | Dufva | G06F 3/0393 345/168 |
| 2016/0137126 A1 | 5/2016 | Fursich et al. | |
| 2023/0012629 A1* | 1/2023 | Shin | G06V 20/597 |
| 2023/0179856 A1* | 6/2023 | Shin | H04N 5/77 348/222.1 |
| 2024/0422284 A1* | 12/2024 | Vanchinathan | H04N 23/632 |

FOREIGN PATENT DOCUMENTS

| | | |
|---|---|---|
| EP | 3401166 | 3/2020 |
| WO | 2022192663 | 9/2022 |

OTHER PUBLICATIONS

Nishihara translation of DE 102009032637 Jul. 10, 2009 (Year: 2009).*

Conway, David P translation of CN 102187694 A 2009-05-28 (Year: 2009).*

NISHIHARA translation of DE 102009032637 2009-07-10 (Year: 2009).*

International Search Report and Written Opinion for International Patent Application No. PCT/EP2024/055245 dated Sep. 30, 2024.

International Search Report and Written Opinion for International Patent Application No. PCT/EP2024/063113 dated Nov. 21, 2024.

* cited by examiner

METHOD AND APPARATUS FOR CMS HAVING TOUCHSCREEN-BASED ZOOM FEATURES

TECHNICAL FIELD

This disclosure relates to a camera monitor system (CMS), and more particularly to a method and apparatus for a CMS having touchscreen-based zoom features.

BACKGROUND

Vehicle camera systems for mirror replacement or for supplementing mirror views are utilized in commercial vehicles to enhance the ability of a vehicle operator to see a surrounding environment of the commercial vehicle. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

SUMMARY

A method for a camera monitor system (CMS) according to an example embodiment of the present disclosure includes displaying image feeds from a plurality of CMS cameras on a plurality of CMS displays. The image feeds depict an environment surrounding a commercial vehicle. The method also includes receiving a touchscreen command for a particular one of the CMS displays on a touchscreen interface and adjusting a zoom level of the image feed on the particular one of the CMS displays based on the touchscreen command.

In a further embodiment of the foregoing embodiment, the method includes providing the touchscreen interface on the particular one of the CMS displays.

In a further embodiment of any of the foregoing embodiments, adjusting the zoom level includes utilizing an object detection algorithm to identify at least one predefined item in one of the image feeds. The predefined item is a vehicle item or an environmental item. Adjusting the zoom level also includes augmenting the image feed on the particular one of the CMS displays to add a visual indication of the at least one detected predefined item. The touchscreen command is a selection of a particular one of the at least one detected predefined items based on the augmenting. The adjusted zoom level enlarges the selected item on one of the CMS displays.

In a further embodiment of any of the foregoing embodiments, adjusting the zoom level includes utilizing an object detection algorithm to identify at least one predefined item in one of the image feeds. The predefined item is a vehicle item or an environmental item. Adjusting the zoom level includes, based on receiving the touchscreen command within a selection area for a particular one of the predefined items, prompting the user to confirm that the user meant to select the particular one of the at least one predefined items, and upon receiving confirmation from the user that the user meant to select the particular one of the predefined items, performing the adjusting to enlarge the particular one of the at least one predefined items.

In a further embodiment of any of the foregoing embodiments, the method includes providing the touchscreen interface on one of the plurality of CMS displays that is separate from the particular one of the CMS displays.

In a further embodiment of any of the foregoing embodiments, the touchscreen command is a reverse pinch command in which two fingers that contact the touchscreen interface spread apart from each other, and the adjusting includes increasing a zoom level of the image feed on the particular one of the CMS displays; or the touchscreen command is a pinch command in which two fingers that contact the touchscreen interface move towards each other, and the adjusting includes reducing a zoom level of the image feed on the particular one of the CMS displays.

In a further embodiment of any of the foregoing embodiments, the method includes, based on a current zoom level of the image feed on the particular one of the CMS displays differing from a default zoom level, displaying a zoom notification element to a vehicle occupant on the touchscreen interface; and reverting to the default zoom level based on receipt of a touchscreen command on the touchscreen interface in which the zoom notification element is selected.

In a further embodiment of any of the foregoing embodiments, the touchscreen command in which the zoom notification element is selected is a double click of the zoom notification element.

In a further embodiment of any of the foregoing embodiments, the method also includes, based on receipt of a selection of an object through the touchscreen interface, panning the image feed on the particular one of the CMS displays to keep the object in a field of view of the image feed on the particular one of the CMS displays as the object moves relative to the commercial vehicle.

In a further embodiment of any of the foregoing embodiments, the adjusting includes maintaining the image feed at a default zoom level as a background image in a first display area of the particular one of the CMS displays, and superimposing a copy of the image feed at the adjusted zoom level on top of the background image in a second display area of the particular one of the CMS displays.

A camera monitor system (CMS) according to an example embodiment of the present disclosure includes a plurality of CMS cameras configured to record images of an environment surrounding a commercial vehicle, a plurality of CMS displays, and a CMS electronic control unit (ECU). The CMS ECU is configured to display image feeds from the plurality of CMS cameras on the plurality of CMS displays, receive a touchscreen command for a particular one of the CMS displays on a touchscreen interface, and adjust a zoom level of the image feed on the particular one of the CMS displays based on the touchscreen command.

In a further embodiment of the foregoing embodiment, the touchscreen interface is provided on the particular one of the CMS displays.

In a further embodiment of any of the foregoing embodiments, to adjust the zoom level, the CMS ECU is configured to utilize an object detection algorithm to identify at least one predefined item in one of the image feeds. The predefined item is a vehicle item or an environmental item. The CMS ECU is also configured to augment the image feed on the particular one of the CMS displays to add a visual indication of the at least one detected predefined item. The touchscreen command is a selection of a particular one of the at least one detected predefined items based on the augmentation. The adjusted zoom level enlarges the selected item on one of the CMS displays.

In a further embodiment of any of the foregoing embodiments, to adjust the zoom level, the CMS ECU is configured to utilize an object detection algorithm to identify at least one predefined item in one of the image feeds. The predefined item is a vehicle item or an environmental item. The CMS ECU is also configured to, based on receipt of the touchscreen command within a selection area for a particular one of the predefined items, prompt the user to confirm that the user meant to select the particular one of the at least one predefined items; and, upon receipt of confirmation from the user that the user meant to select the particular one of the predefined items, perform the adjustment to enlarge the particular one of the at least one predefined items.

In a further embodiment of any of the foregoing embodiments, the touchscreen interface is provided on one of the plurality of CMS displays that is separate from the particular one of the CMS displays.

In a further embodiment of any of the foregoing embodiments, the touchscreen command is a reverse pinch command in which two fingers that contact the touchscreen interface spread apart from each other, and the adjustment includes an increase of a zoom level of the image feed on the particular one of the CMS displays; or the touchscreen command is a pinch command in which two fingers that contact the touchscreen interface move towards each other, and the adjustment includes a reduction in a zoom level of the image feed on the particular one of the CMS displays.

In a further embodiment of any of the foregoing embodiments, the CMS ECU is configured to, based on a current zoom level of the image feed on the particular one of the CMS displays differing from a default zoom level, display a zoom notification element to a vehicle occupant on the touchscreen interface, and revert to the default zoom level based on receipt of a touchscreen command on the touchscreen interface in which the zoom notification element is selected.

In a further embodiment of any of the foregoing embodiments, the touchscreen command in which the zoom notification element is selected is a double click of the zoom notification element.

In a further embodiment of any of the foregoing embodiments, the CMS ECU is configured to, based on receipt of a selection of an object through the touchscreen interface, pan the image feed on the particular one of the CMS displays to keep the object in a field of view of the image feed on the particular one of the CMS displays as the object moves relative to the commercial vehicle.

In a further embodiment of any of the foregoing embodiments, to adjust the zoom level of the image feed on the particular one of the plurality of CMS displays, the CMS ECU is configured to maintain the image feed at a default zoom level as a background image in a first display area of the particular one of the CMS displays and superimpose a copy of the image feed at the adjusted zoom level on top of the background image in a second display area of the particular one of the CMS displays.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein.

DETAILED DESCRIPTION

Schematic views of a commercial vehicle 10 are illustrated in FIGS. 1-4. The commercial vehicle 10 includes a vehicle cab or "tractor" 12 for pulling a trailer 14, where the trailer 14 pivots with respect to the tractor 12 during turns. Although the commercial vehicle 10 is depicted as a commercial truck with a single trailer in this disclosure, it is understood that other commercial vehicle configurations may be used (e.g., different types or quantities of trailers).

A pair of camera arms 16A-B include a respective base that is secured to, for example, the tractor 12. A pivoting arm is supported by the base and may articulate relative thereto. At least one rearward facing camera 20A-B is arranged respectively on or within the camera arms 16A-B. The exterior cameras 20A-B respectively provide an exterior field of view $FOV_{EX1}$, $FOV_{EX2}$ that each include at least one of Class II and Class IV views (FIG. 2), which are legally prescribed views in the commercial trucking industry.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as an example of the type of view provided to a display from a particular camera.

Each camera arm 16A-16B may also provide a housing that encloses electronics, e.g., a controller, that are configured to provide various features of the CMS 15. The camera arms 16A-B may be mounted either at a roof-mount location over the cab door (as shown), or on a door-mounted bracket or station, for example.

Figure 1:
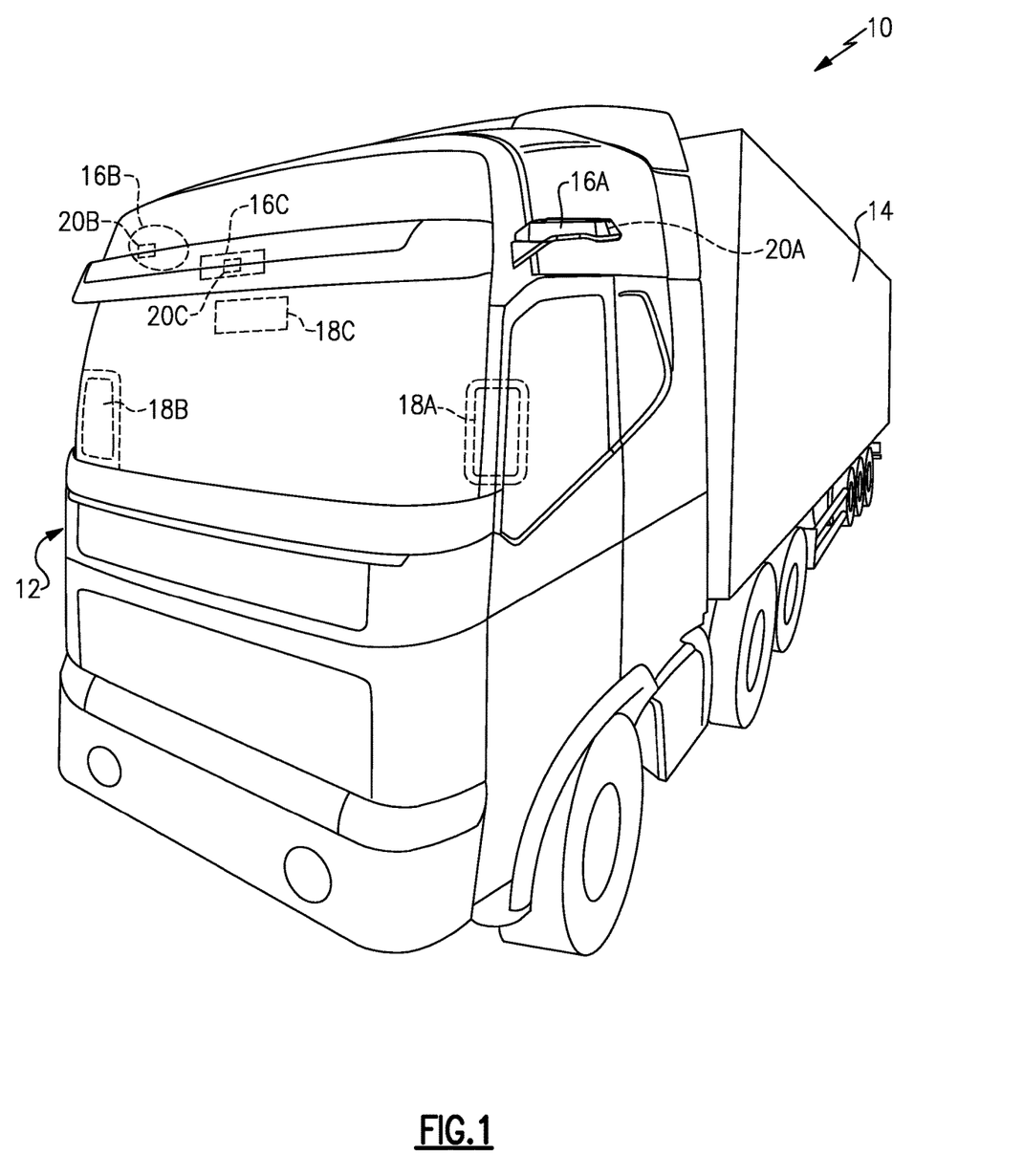
FIG. 1 is a schematic front view of a commercial truck with a camera mirror system (CMS) used to provide at least Class II and Class IV views.
Figure 2:
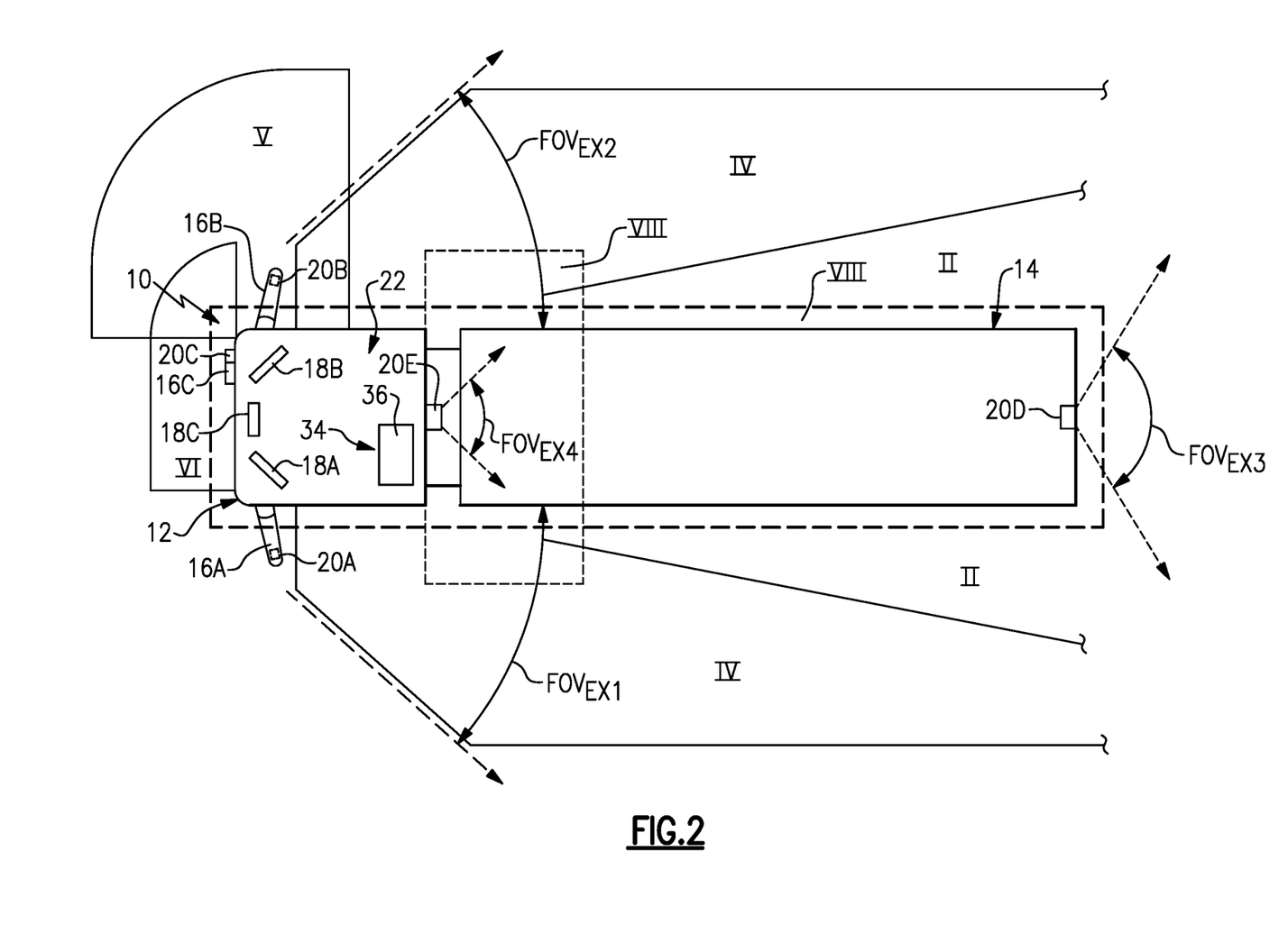
FIG. 2 is a schematic birds-eye view of the commercial truck of FIG. 1 with a CMS providing Class II, Class IV, Class V, Class VI, and Class VIII views.

If video of Class V and/or Class VI views is also desired, a camera housing 16C and camera 20C may be arranged at or near the front of the commercial vehicle 10 to provide those views (FIG. 2).

A backup camera 20D may be provided which provides a field of view $FOV_{EX3}$. The backup camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor 12 and that provides a field of view $FOV_{EX4}$. The fifth wheel camera 20E may be mounted anywhere between the lateral plane of the fifth wheel fixture and the top/roof edge of the tractor, for example.

Figure 3:
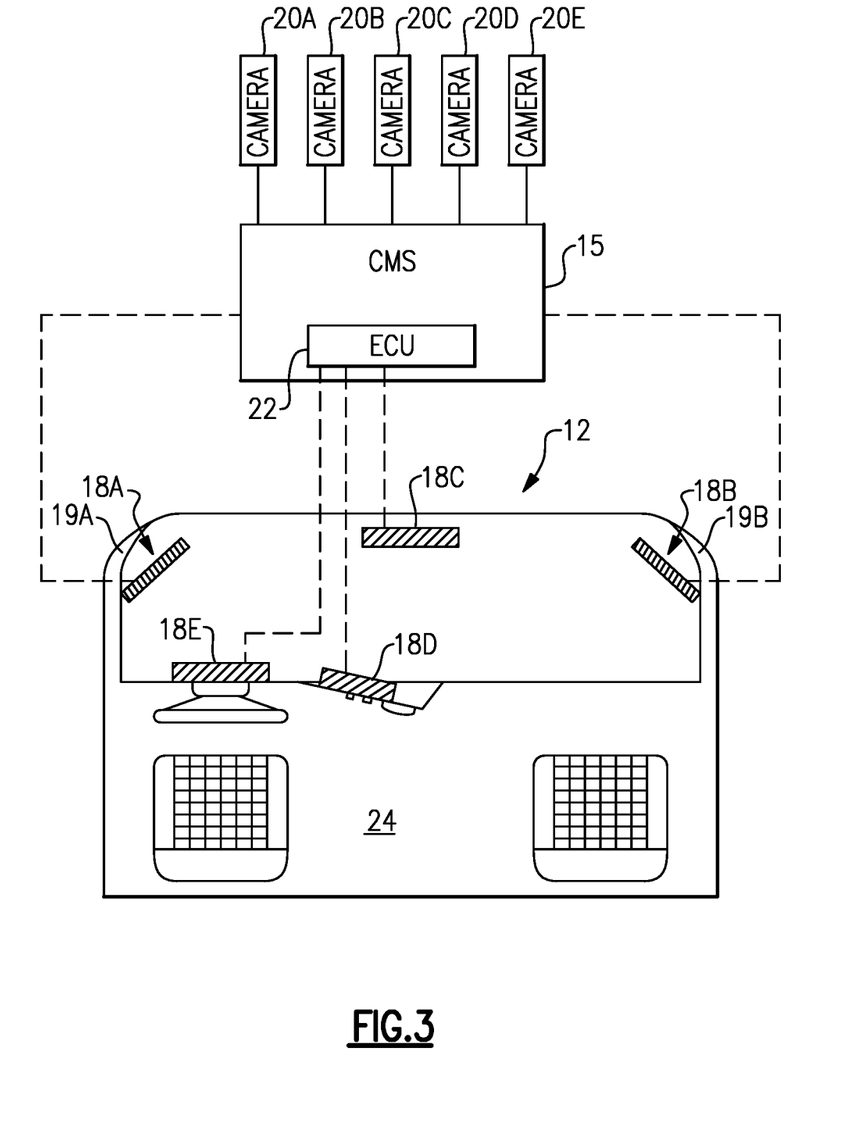
FIG. 3 is a schematic top view of an example vehicle cabin interior.
Figure 4:
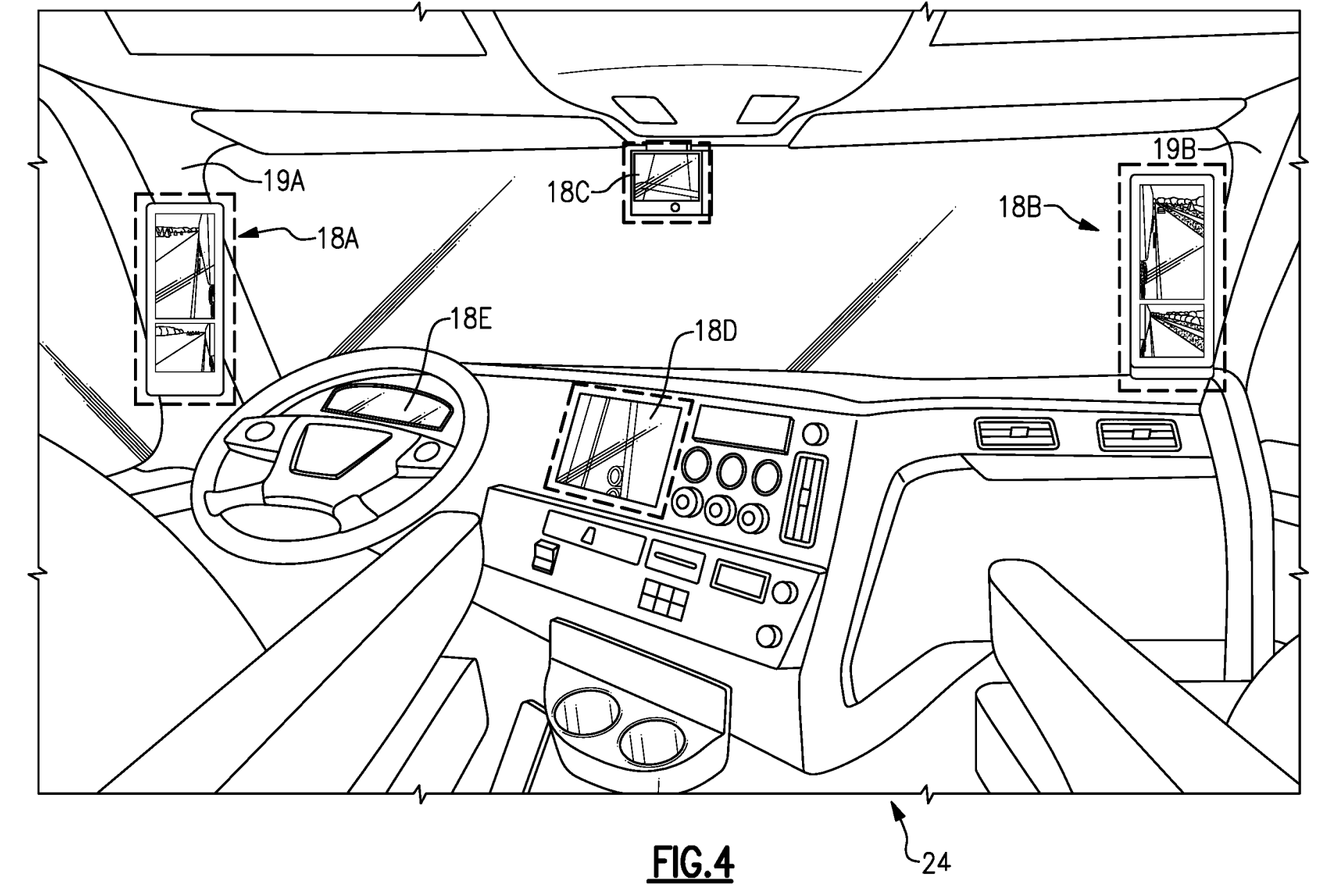
FIG. 4 is a perspective view of the vehicle cabin interior of FIG. 3.

FIG. 3 is a schematic top view of an example vehicle cabin interior 24, and FIG. 4 is a perspective view of the vehicle cabin interior 24. Referring now to FIGS. 3-4 with continued reference to FIGS. 1-2, electronic displays 18A-E (e.g., which may be video displays, such as LCD displays) and cameras 20A-E are shown. The various electronic displays 18A-E and cameras 20A-E are part of a camera monitor system (CMS) 15, and therefore act as CMS displays and CMS cameras. As used herein, a "CMS camera" 20 is a camera configured to record images of an environment surrounding a commercial vehicle 10, and a "CMS display" 18 is an electronic display (e.g., an LCD) that is configured to image feeds from those cameras.

The CMS 15 includes a CMS electronic control unit (ECU) 22 that acts as a controller and includes processing circuitry that supports operation of the CMS 15. The CMS ECU 22 is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The CMS displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). In the example of FIG. 3, additional displays 18C-E are provided. Display 18C is arranged in the vehicle cabin interior 24 near the top center of the windshield may be used to display the Class V and Class VI views, which are toward the front of the commercial vehicle 10, or a backup camera view (from camera 20D or 20E) to the driver. Display 18D is provided in a center console area of the vehicle cabin interior 24, and may be used for other purposes, such as navigation, infotainment, etc. Display 18E may be part of an instrument cluster, for example.

If video of Class VIII views is desired, camera housings can be disposed at the sides and rear of the commercial vehicle 10 to provide fields of view including some or all of the Class VIII zones of the commercial vehicle 10. In such examples, one of the displays 18C-E may include one or more frames displaying the Class VIII views. The displays 18A, 18B, 18C face a driver region within the vehicle cabin interior 24 where an operator is seated on a driver seat.

If desired, the camera arms 16A-B may include conventional mirrors integrated with them as well, although the CMS 15 may be used to entirely replace mirrors. In additional examples, each side can include multiple camera arms, with each arm housing one or more cameras and/or mirrors.

Figure 5A:
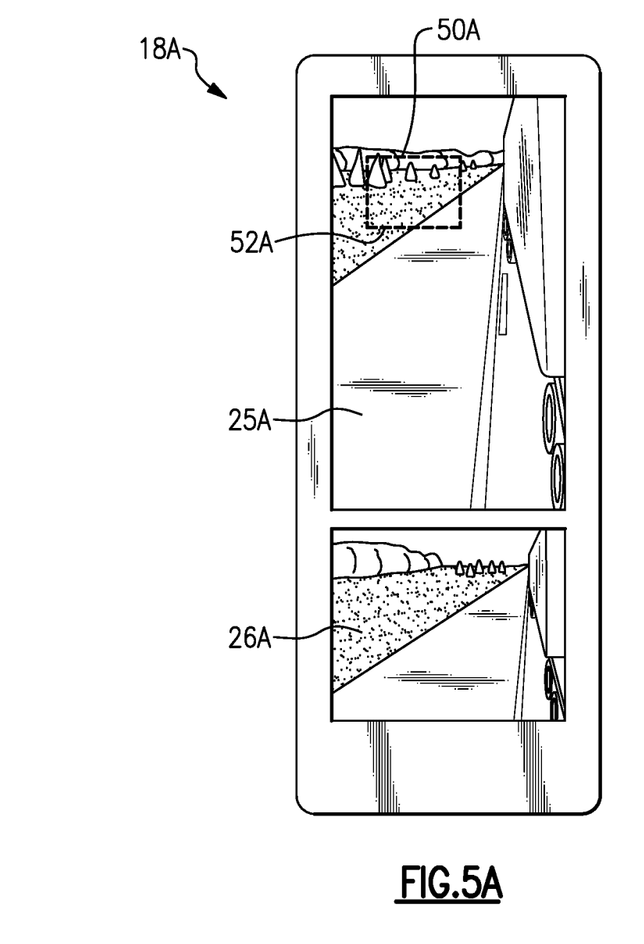
FIG. 5A is a schematic view of a first electronic display from FIGS. 1-2.
Figure 5B:
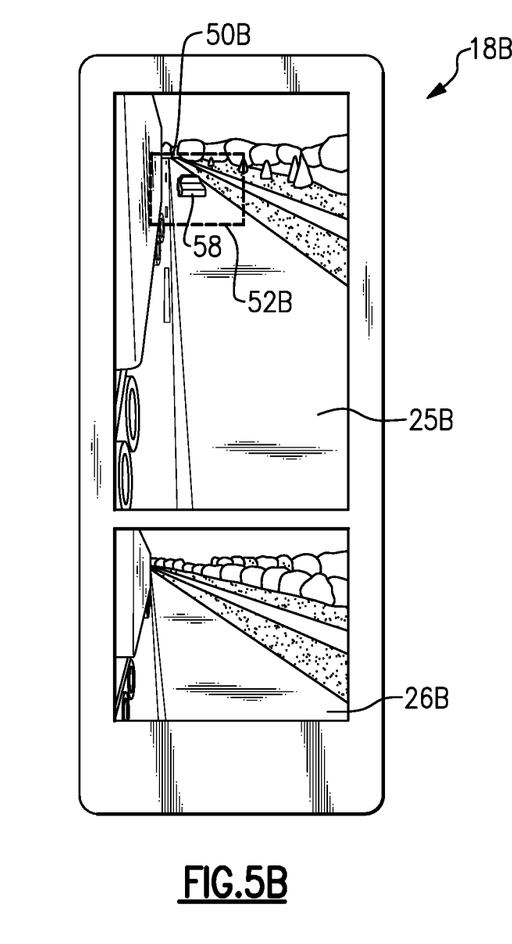
FIG. 5B is a schematic view of a second electronic display from FIGS. 1-2.

FIG. 5A is a schematic view of the electronic display 18A from FIGS. 1-4, and FIG. 5B is a schematic view of the electronic display 18B from FIGS. 1-4. Each display 18A-B includes a respective first display area 25A-B and a respective second display area 26A-B. In the example of FIGS. 5A-B, display area 25A is configured to display a Class II view from camera 16A, and display area 26A is configured to display a Class IV view from camera 16A (or an additional, wide angle camera situated on the same side of the commercial vehicle as camera 16A). Similarly, display area 25B is configured to display a Class II view from camera 16B, and display area 26B is configured to display a Class IV view from camera 16B (or an additional, wide angle camera situated on the same side of the commercial vehicle as camera 16B).

As will be discussed below in greater detail, the CMS 15 includes functionality for zooming in and out on CMS images based on touchscreen commands received through a touchscreen interface (e.g., pinch-based commands, such as pinch and reverse pinch, and double click commands, or predefined tap sequences). The touchscreen interface may be provided on one of the CMS displays, or through a separate touchscreen interface. In one or more embodiments a "bring your own device" configuration is supported, in which a vehicle occupant can use their own personal device (e.g., a tablet) as a CMS display and/or a touchscreen interface (e.g., a tablet).

Assume for the example below that the touchscreen interface is provided in display area 25A of CMS display 18A. A vehicle occupant provides a reverse pinch touchscreen command for CMS display 18B by on display area 25A of CMS display 18A. The command is provided in region 50A of the display area 25A of CMS display 18A, which is bounded by an area indicator 52A (a dotted line in the example of FIG. 5A), which corresponds to region 50B of the display area 25B of CMS display 18B, which depicts a vehicle 58, and is surrounded by an area indicator 52B (a dotted line in the example of FIG. 5B). Since the driver may be unable to reach the CMS display 18B, the touchscreen interface provided by electronic display 18A may be a convenient way to provide commands for the potentially out-of-reach CMS display 18B.

The received command is one in which two fingers that contact the touchscreen interface spread apart from each other, which requests a zoom/enlargement of the region 50.

Figure 6A:
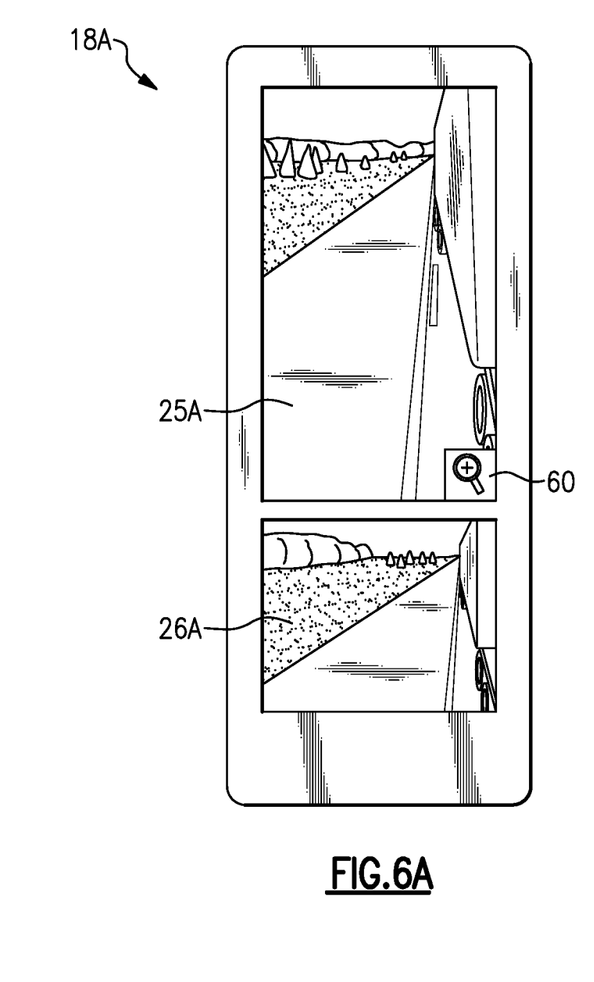
FIG. 6A is a schematic view of the first electronic display from FIGS. 1-2 and 5A that includes a zoom notification element.
Figure 6B:
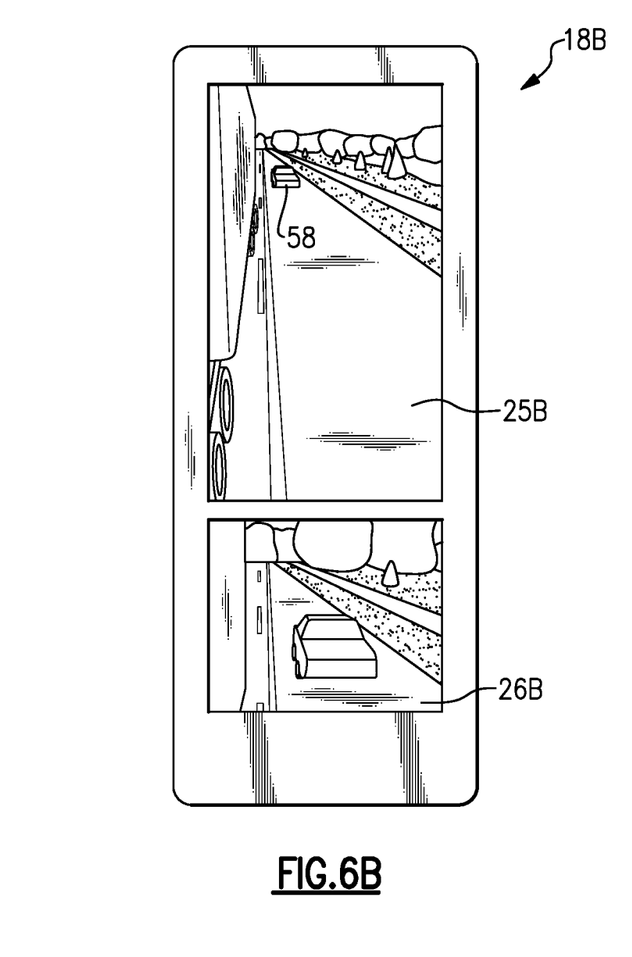
FIG. 6B is a schematic view of the second electronic display from FIGS. 1-2 and 5B in a zoom configuration.

FIGS. 6A and 6B provide schematic views of the CMS displays 18A-B, respectively, after receipt of the enlargement command. As shown in FIG. 6A-B, after receipt of the command, CMS display 18B now includes an enlargement of the region 50B in display area 26B (such that the current zoom level differs from a default zoom level), and CMS display 18A now includes a zoom notification element 60 to indicate that the zoom level of the region 50B has been adjusted from a default level (e.g., a standard Class II view), to a zoomed in view in display area 26B. In this manner, the zoom notification element 60 notifies a vehicle occupant of an adjustment from a default zoom level.

In the example above, a reverse pinch command causes the CMS 15 to increase a zoom level of the image feed on CMS display 18B. If a pinch command is received in which two fingers contact the touchscreen interface move towards each other, the CMS 15 interprets this as a command to reduce a zoom level (e.g., to or below the default zoom level), and correspondingly performs the zoom reduction.

In the example above, the CMS display 18A provides a touchscreen interface for CMS display 18B, and the displays 18A and 18B are separate from each other. In a further example, the touchscreen interface for a particular CMS display 18 is provided on the CMS display itself. Thus, a user may provide a zoom command for CMS display 18B on one of the display areas of CMS display 18B, for example.

In one or more embodiments, the CMS 15 reverts to the default zoom level based on receipt of a touchscreen command on the touchscreen interface in which the zoom notification element 60 is selected (e.g., a double click) and/or through a timeout (e.g., no further zoom commands being received for a predefined time period).

Figure 6C:
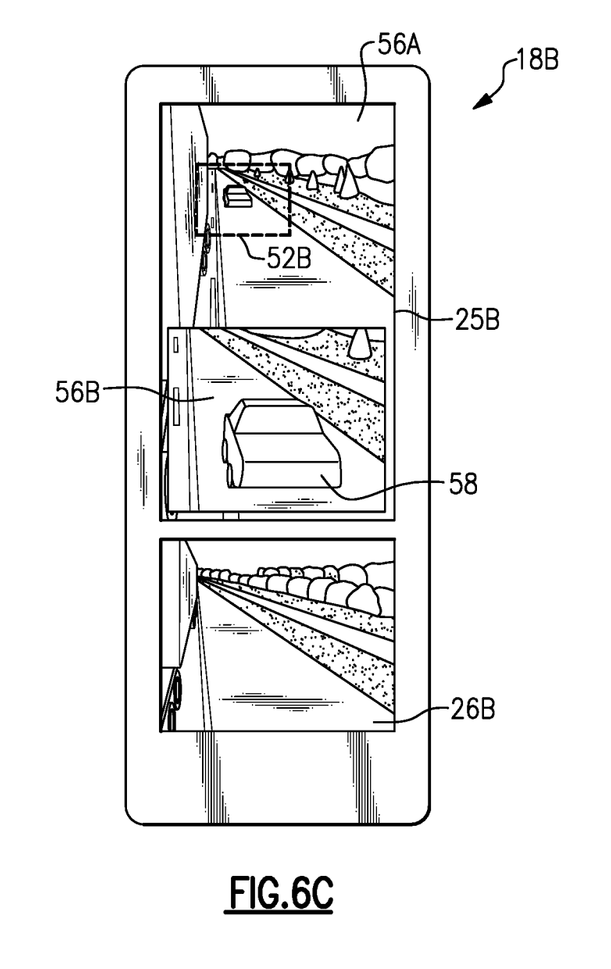
FIG. 6C is a schematic view of the electronic display of FIG. 6B in another zoom configuration.

FIG. 6C is a schematic view of another example zoom enlargement configuration, in which the region 50B is enlarged within display area 25B in a "picture-in-picture" configuration. In this example, the CMS 15 maintains the image feed from camera 20B at a default zoom level as a background image in a first portion 56A of display area 25B, and superimposes a copy of the image feed from camera 20B at the adjusted (enlarged in the case of FIG. 6D) zoom level on top of the background image in a second portion 56B of display area 25B.

Figure 6D:
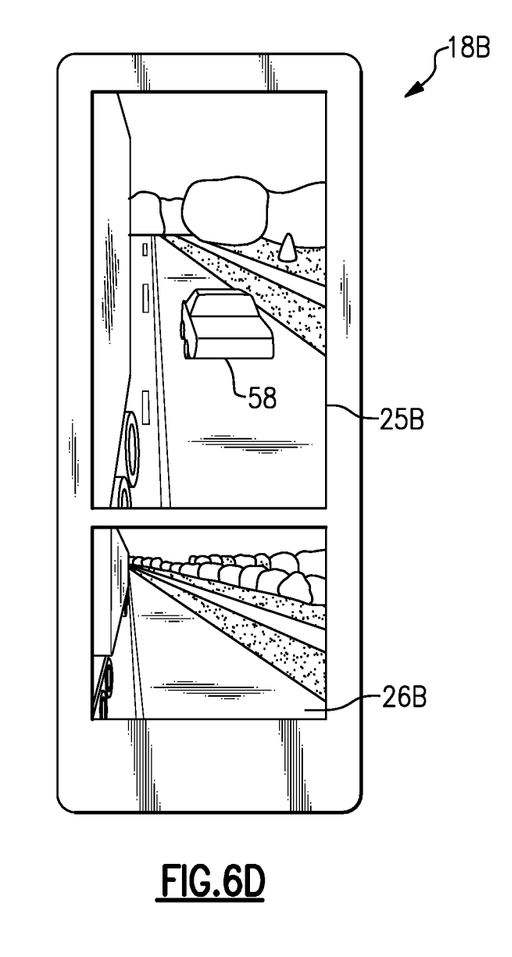
FIG. 6D is a schematic view of the electronic display of FIG. 6B in another zoom configuration.

FIG. 6D is a schematic view of another example enlargement display configuration, in which the region 50B is enlarged in the display area 25B and fills the entire display area 25B.

In one or more embodiments, a touch-and-drag command may be provided by a vehicle occupant to move the region 52A and correspondingly move the region 50B, in which a vehicle occupant touches the region 52A and drags the region to some other area of the display area 25A to enlarge a different portion of the displayed image. In one or more embodiments, the touch-and-drag command is provided directly on the display 18B.

In one or more embodiments, based on receipt of a selection of an object (e.g., the vehicle 58, a vulnerable road user, a rear tire of the trailer 14, etc.) through the touchscreen interface (e.g., while the zoom level is greater than the default zoom level), the CMS 15 pans the image feed featuring the object to keep the object in a field of view of the image feed as the object moves relative to the commercial vehicle. This may correspond to a double click, for example. The panning may be performed in any of the image enlargements of FIGS. 6B-D, for example. Of particular interest to an operator of the commercial vehicle 10 may be an enlarged view of one or more rear tires of the trailer 14, so that the operator can monitor the tire(s) during turns, and avoid the trailer 14 unintentionally contacting an object (e.g., a curb).

It is understood that FIGS. 6A-D are non-limiting examples, and that display areas having non-default zoom levels could be provided in other locations as well. Also, although zoom features are discussed in connection with a Class II view above, it is understood that they could be provided for other views, such as a Class IV and/or Class V view, and/or backup camera view.

In one or more embodiments, the CMS ECU 22 is configured to utilize an object detection algorithm to identify one or predefined vehicle items and/or predefined environmental items in one of the image feeds. The predefined vehicle items may include things of interest to a driver of a commercial vehicle, such as a rear tire location, trailer edge, etc. The environmental items may include vulnerable road users ("VRUs" such as pedestrians, cyclists, etc.), curbs, or lanes, for example. Since object detection algorithms are well-known in the art, their inner workings are not discussed in detail herein.

In one or more embodiments, the CMS ECU 22 receives a touchscreen command, performs object detection (as discussed above), based on the touch screen command being received within a selection area for a detected item (e.g., within a predefined number of pixels surrounding a boundary of the detected predefined item), the CMS ECU 22 prompts the vehicle occupant to confirm that the user meant to select the detected predefined item. Upon receiving confirmation from the user that the user meant to select the particular detected item, the adjusting is performed to enlarge the particular one of the at least one predefined items. The object detection may be performed before or after the touchscreen command is received in various embodiments.

Assume that the CMS ECU 22 has detected a rear wheel in display area 25B, and that a vehicle occupant has provided a touchscreen command to select the rear wheel (e.g., touching the depicted rear tire on display 18B or on a corresponding location of another touchscreen interface). The CMS ECU 22 provides a prompt to the user in display area 26B to confirm that the user intended to select the rear wheel. However, it is understood that it could be provided elsewhere, such as along a bottom of display area 25B.

If the user selects "Yes," then display 18B zooms in on the rear wheel. In one or more embodiments, the CMS ECU 22 also pans to keep the selected object in display as it moves within a field of view of the CMS 15. In one or more embodiments, if the user selects "No" to the prompt, a prompt for another nearby item is provided, such as "Trailer edge selected?"

In one example, the prompt described above corresponds to providing an augmentation of the particular item (e.g., an overlay or boundary), and upon receiving a subsequent command to confirm the selection (e.g., another tap in the same area where the first tap was provided), the CMS ECU 22 interprets the subsequent command as confirmation.

In one or more embodiments, the CMS ECU 15 utilizes an object detection algorithm to identify a predefined item (as discussed above, such as a VRU) in one of the image feeds, and augments the image feed on one of the CMS displays to add a visual indication of the detected VRU. The augmentation may include by providing an overlay on the VRU on one of the CMS displays 18 or adding an outline to the VRU on one of the CMS displays, for example. A touchscreen command is received based on the augmented display that selects the VRU, and the CMS ECU 15 adjusts the zoom level to enlarge the VRU on one of the CMS displays 18, and optionally also to pan the image feed to follow the VRU as the VRU moves in the image feed. The touchscreen command may be a predefined command, such as a double tap or triple tap, for example.

Figure 7:
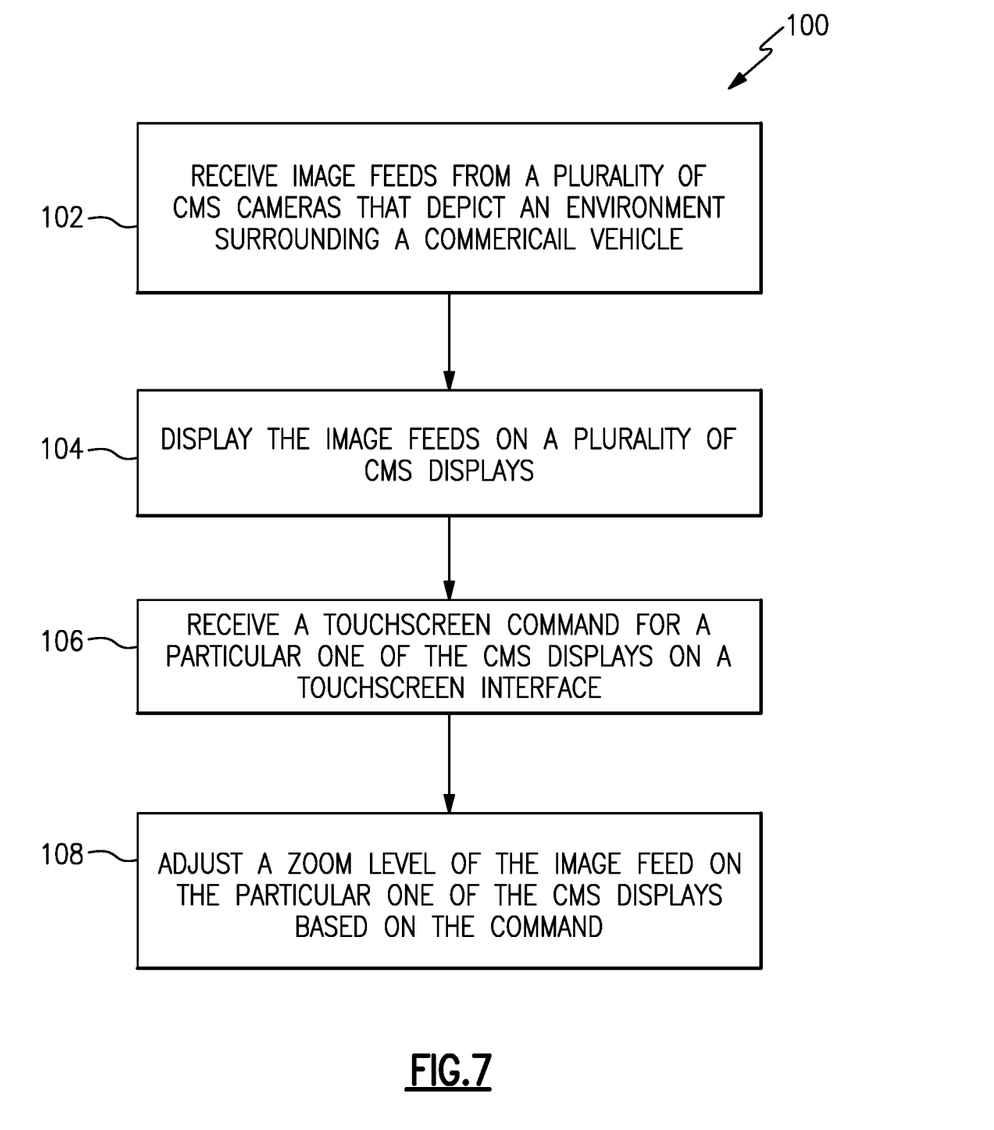
FIG. 7 is a flowchart of an example method for a CMS.

FIG. 7 is a flowchart of an example method 100 for a CMS 15. The ECU 22 of the CMS 15 receives image feeds from a plurality of CMS cameras 18 that depict an environment surrounding a commercial vehicle 10 (step 102). The CMS ECU 22 displays the various image feeds on respective ones of the plurality of CMS displays 18 (step 104). The CMS ECU 22 receives a touchscreen command for a particular one of the CMS displays 18 on a touchscreen interface and from a vehicle occupant (e.g., a driver or passenger) (step 106), and adjusts a zoom level of the image feed on the particular one of the CMS displays based on the command (step 108).

As discussed above, the touchscreen command may be a pinch command in which two fingers that contact the touchscreen interface move towards each other (corresponding to a request for decreasing a zoom level) or a reverse-pinch command in which two fingers that contact the touchscreen interface spread apart from each other (corresponding to a request for increasing a zoom level).

Although the examples above focus on providing zooming on CMS display 18B, it is understood that this is a non-limiting example, and that zooming could be provided on any CMS display using the techniques discussed herein.

Although example embodiments have been disclosed, a worker of ordinary skill in this art would recognize that certain modifications would come within the scope of the claims. For that reason, the following claims should be studied to determine their true scope and content.

What is claimed is:

1. A method for a camera monitor system (CMS), comprising:
   displaying image feeds from a plurality of CMS cameras on a plurality of CMS displays, wherein the image feeds depict an environment surrounding a commercial vehicle;
   receiving a touchscreen zoom command for a first one of the plurality of CMS displays on a touchscreen interface;
   adjusting a zoom level of the image feed on the first one of the plurality of CMS displays based on the touchscreen zoom command;
   receiving an object selection as a touchscreen command; and
   based on receipt of object selection, automatically panning the image feed on at least one of the plocality of CMS displays to keep object in a field of view of the image feed on said at least one of the plurality of CMS displays as the object moves relative to the commercial vehicle.

2. The method of claim 1, comprising providing the touchscreen interface on the first one of the plurality of CMS displays.

3. The method of claim 1, wherein said adjusting a zoom level comprises:
   utilizing an object detection algorithm to identify at least one predefined item in one of the image feeds, wherein the predefined item is a vehicle item or an environmental item; and
   augmenting the image feed on the particular one of the CMS displays to add a visual indication of the at least one detected predefined item;
   wherein the obiect selection is a selection of a particular one of the at least one detected predefined items in the augmented image feed.

4. The method of claim 1, wherein said adjusting a zoom level comprises:
   utilizing an object detection algorithm to identify at least one predefined item in one of the image feeds, wherein the predefined item is a vehicle item or an environmental item; and
   based on receiving the touchscreen command within a selection area for a particular one of the predefined items:
      prompting the user to confirm that the user meant to select the particular one of the at least one predefined items; and
      upon receiving confirmation from the user that the user, in response to the prompting, meant to select the particular one of the predefined items, performing said adjusting to enlarge the particular one of the at least one predefined items.

5. The method of claim 1, comprising providing the touchscreen interface on one of the plurality of CMS displays other than the first one of the plurality of CMS displays.

6. The method of claim 1, wherein:
   the touchscreen command is a reverse pinch command in which two fingers that contact the touchscreen interface spread apart from each other, and said adjusting comprises increasing a zoom level of the image feed on the first one of the plurality of CMS displays; or
   the touchscreen command is a pinch command in which two fingers that contact the touchscreen interface move towards each other, and said adjusting comprises reducing a zoom level of the image feed on the first one of the plurality of CMS displays.

7. The method of claim 1, comprising:
   based on a current zoom level of the image feed on the first one of the plurality of CMS displays differing from a default zoom level, displaying a zoom notification element to a vehicle occupant on the touchscreen interface; and
   reverting to the default zoom level based on receipt of a touchscreen command on the touchscreen interface in which the zoom notification element is selected.

8. The method of claim 7, wherein the touchscreen command in which the zoom notification element is selected is a double click of the zoom notification element.

9. The method of claim 1, wherein said adjusting comprises:
   maintaining the image feed at a default zoom level as a background image in a first display area of the first one of the plurality of CMS displays; and
   superimposing a copy of the image feed at the adjusted zoom level on top of the background image in a second display area of the first one of the plurality of CMS displays.

10. A camera monitor system (CMS), comprising:
    a plurality of CMS cameras configured to record images of an environment surrounding a commercial vehicle;
    a plurality of CMS displays; and
    a CMS electronic control unit (ECU) configured to:
       display image feeds from the plurality of CMS cameras on the plurality of CMS displays;
       receive a touchscreen zoom command for a first one of the plurality of CMS displays on a touchscreen interface; and
       adjust a zoom level of the image feed on the first one of the plurality of CMS displays based on the touchscreen zoom command; and
       receive an object selection as a touchscreen command; and
       based on receipt of the object selection, automatically pan the image feed on at least the one of the plurality of CMS displays to keep object in a field of view of the image feed on said at least one of the plurality of CMS displays as the object moves relative to the commercial vehicle.

11. The CMS of claim 10, wherein the touchscreen interface is provided on the first one of the plurality of CMS displays.

12. The CMS of claim 10, wherein to adjust the zoom level, the CMS ECU is configured to:
    utilize an object detection algorithm to identify at least one predefined item in one of the image feeds, wherein the predefined item is a vehicle item or an environmental item; and augment the image feed on the particular one of the CMS displays to add a visual indication of the at least one detected predefined item;

wherein the object selection is a selection of a particular one of the at least one detected predefined items in the augmented image feed.

13. The CMS of claim 10, wherein to adjust the zoom level, the CMS ECU is configured to:

utilize an object detection algorithm to identify at least one predefined item in one of the image feeds, wherein the predefined item is a vehicle item or an environmental item; and based on receipt of the touchscreen command within a selection area for a particular one of the predefined items:

prompt the user to confirm that the user meant to select the particular one of the at least one predefined items; and upon receipt of confirmation from the user that the user, in response to the prompt meant to select the particular one of the predefined items, perform the adjustment to enlarge the particular one of the at least one predefined items.

14. The CMS of claim 10, wherein the touchscreen interface is provided on one of the plurality of CMS displays other than the first one of the plurality of CMS displays.

15. The CMS of claim 10, wherein:

the touchscreen command is a reverse pinch command in which two fingers that contact the touchscreen interface spread apart from each other, and the adjustment comprises an increase of a zoom level of the image feed on the first one of the plurality of CMS displays; or the touchscreen command is a pinch command in which two fingers that contact the touchscreen interface move towards each other, and the adjustment comprises a reduction in a zoom level of the image feed on the first one of the plurality of CMS displays.

16. The CMS of claim 10, wherein the CMS ECU is configured to:

based on a current zoom level of the image feed on the first one of the plurality of CMS displays differing from a default zoom level, display a zoom notification element to a vehicle occupant on the touchscreen interface; and revert to the default zoom level based on receipt of a touchscreen command on the touchscreen interface in which the zoom notification element is selected.

17. The CMS of claim 16, wherein the touchscreen command in which the zoom notification element is selected is a double click of the zoom notification element.

18. The CMS of claim 10, wherein to adjust the zoom level of the image feed on the particular one of the plurality of CMS displays, the CMS ECU is configured to:

maintain the image feed at a default zoom level as a background image in a first display area of the first one of the plurality of CMS displays; and superimpose a copy of the image feed at the adjusted zoom level on top of the background image in a second display area of the first one of the plurality of CMS displays.

* * * * *